(No Model.)
W. R. MARKHAM.
VEHICLE SPRING.
No. 550,454. Patented Nov. 26, 1895.
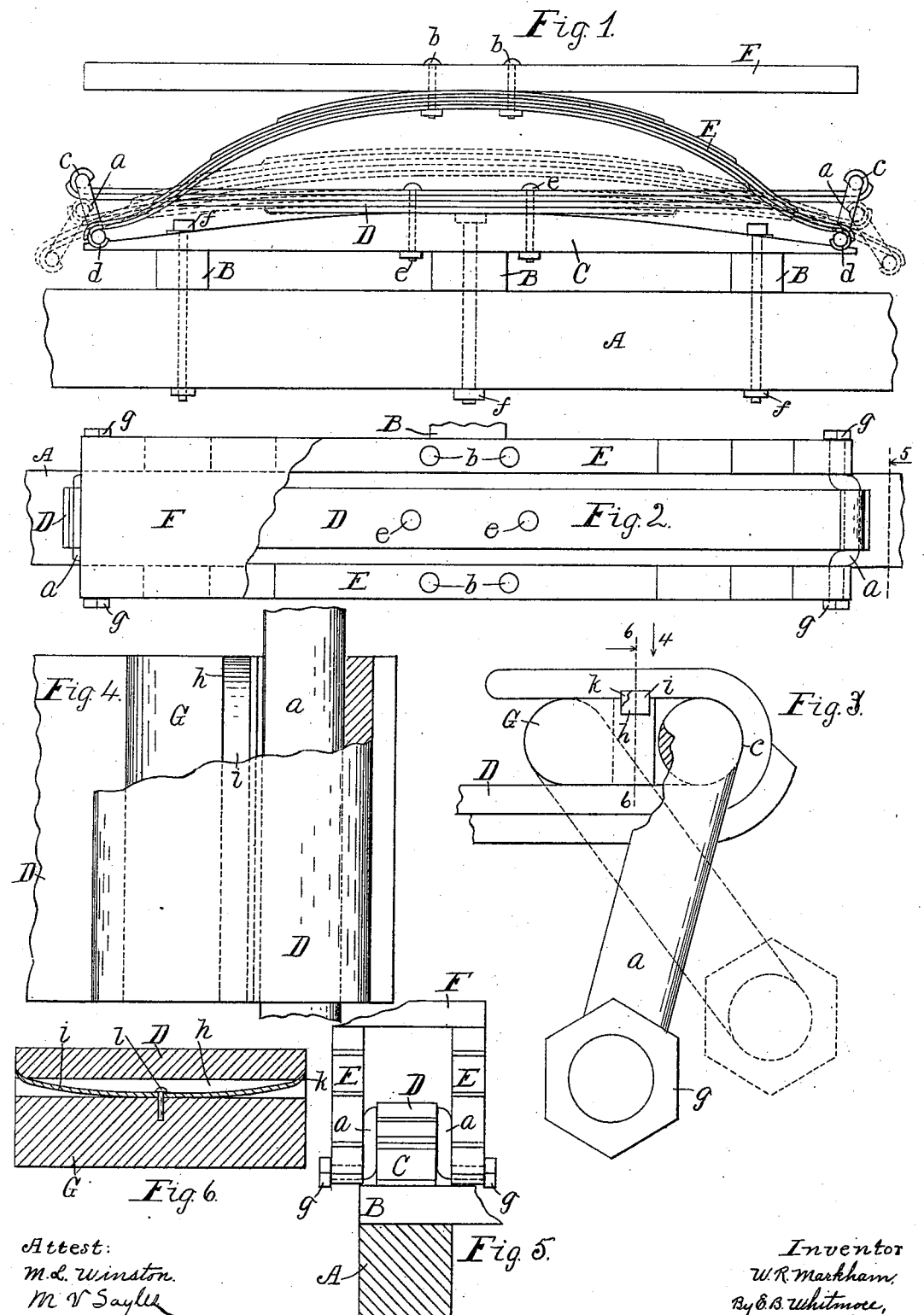
Attest:
M. L. Winston.
M. V. Saylee
Inventor
W. R. Markham
By E. B. Whitmore,
Atty.

UNITED STATES PATENT OFFICE.

WARREN R. MARKHAM, OF HENRIETTA, NEW YORK.

VEHICLE-SPRING.

SPECIFICATION forming part of Letters Patent No. 550,454, dated November 26, 1895.

Application filed August 30, 1895. Serial No. 561,006. (No model.)

*To all whom it may concern:*

Be it known that I, WARREN R. MARKHAM, of Henrietta, in the county of Monroe and State of New York, have invented a new and useful Improvement in Vehicle-Springs, which improvement is fully set forth in the following specification and shown in the accompanying drawings.

My invention relates to wagon-springs, more particularly adapted to farm and freight wagons, including delivery-wagons and the like, and the object of the invention is to produce a spring or combination of springs that will be better adapted to the services required of springs than those in common use, and one that may be altered or adjusted to adapt it to light and heavy loads.

The invention consists in a combination of springs and other parts constructed and arranged as hereinafter fully described and more particularly pointed out.

Referring to the drawings, Figure 1 is a side elevation of the spring, parts being shown in two positions by full and dotted lines. Fig. 2 is a plan of the same, parts being broken away. Fig. 3 is a side elevation of parts at the end of the spring, parts being broken away and other parts shown in two positions by full and dotted lines. Fig. 4 is a plan of the parts shown in Fig. 3, seen as indicated by arrow 4, parts being broken away. Fig. 5 is an end view of the parts seen as indicated by arrow 5 in Fig. 2. Fig. 6 is a cross-section on the dotted line 6 6 in Fig. 3, seen as indicated by arrow. Figs. 3 to 6, inclusive, are drawn to scales larger than that of Figs. 1 and 2.

Referring to the drawings, A is the axle of the wagon, and B B B the reach.

C is a bar, convex at its upper side, constituting a base for the spring, said bar resting upon the reach and held rigidly thereto and to the axle by bolts $f f f$. The spring consists of a central or main part D, straight or slightly curved, resting directly upon the spring-base, and two similar and equal reverse-springs E E, held at either side of the main spring by crank hangers or connectors $a\ a$. The main or central spring is heavier and stiffer than the side springs and about equal to the combined strength and stiffness of the latter.

The crank-hangers, which are preferably round bar steel or iron, turn freely in their several bearings in the springs, and when the wagon is light or unloaded they incline slightly inward at their lower ends, as appears in Fig. 1. The crank-hangers bend downward at each side of the main spring, and their lower ends bend horizontally forward and backward to form rests or bearings for the ends of the side springs, each hanger being provided with a nut $g$ on the outside of the spring to hold the latter in place. The hangers are of such length that the lower ends of the side springs drop considerably below the ends of the main spring, as appears in Fig. 1; but the crowns of the side springs are considerably above the main spring and support upon their upper sides a spring-bar F for holding the box or body of the wagon. This spring-bar is sufficiently wide to cover all the springs, as shown in Fig. 2, and is made rigid with the side springs by bolts $b\ b$. The wagon-box is bolted to the spring-bar or rigidly secured thereto in some other ordinary manner.

I usually prefer to make the main spring about straight, as shown in Fig. 1, and the side springs considerably crowning, and, being of less stiffness than the main spring, they will yield more readily and change form more rapidly when loaded than the main spring. Now, when constructed in this manner a load on the springs tends to bring the bearing-points at $c\ c$ between the main spring and the crank-hangers slightly closer together, while it at the same time tends to push the bearing-points $d\ d$ between the side springs and the hangers farther apart. This tends to cause the hangers when loaded to assume vertical positions or to be swung outward at their lower ends to inclined positions, as shown by dotted lines in Fig. 1.

The extreme ends of the upper leaf of the main spring are bent back over the spring U-shaped, as clearly shown in Fig. 3. Within these U's are placed shiftable or reversible prismatic blocks or bodies G, Figs. 3 and 4, each having a length equal to the width of the spring and a vertical thickness corresponding with the vertical distance across the interior of the respective U's. One side or edge of each of these blocks is plane and the opposite side is hemispherical. These blocks are reversible and each may occupy either of two positions in the central spring shown, respectively, by full and dotted lines. When in the position shown by dotted lines, the convex edge of the block coincides with the concave part or bend at the extreme end of the spring.

Each block is formed with a longitudinal groove $h$, Figs. 3, 4, and 6, in which rests a detent spring or holder $i$, secured to place by a simple fastener $l$. This detent-spring is equal in length with the block and has its ends turned upward to occupy notches or rests $k\ k$ in the sides of the central spring. This holds the block in place in the central spring and prevents its becoming detached and lost, but does not prevent its being pushed endwise out of the spring by the thumb or finger pressed against it when it is wished to reverse it. The groove $h$ and the rests $k\ k$ are relatively so placed that they correspond in either position of the block, the ends of the detent-springs always falling in the notches to hold the block in position.

In carrying light loads the parts are placed, as shown in full lines in Figs. 3 and 4, with the hangers $a$ resting in the extreme ends of the spring D; but for doing heavier work the blocks are reversed and placed in the ends of the springs, the hangers being brought inward toward the middle of the spring and made to bear against the plain faces of the blocks, as appears in Fig. 3. This shifts the bearing-points of the hangers upon the central spring and brings them nearer each other, and so practically shortens the central spring and renders it stiffer and capable of supporting a heavier load. Also, when the parts are in these positions the side springs are in a degree confined endwise or restricted as to the extension of their ends resulting from being loaded and rendered straighter on account of the greater inclination of the hangers, for in this arrangement of the parts the pull of the side springs upon the central spring is lateral as well as downward, which tends to hold the side springs to their bowed or normal curved form.

For lighter wagons I prefer to form the ends of the main spring, as shown in Fig. 1, in which no blocks are used and the hangers are not shiftable.

What I claim as my invention is—

1. The combination in a wagon spring, of a main central spring, and a reverse spring at either side of said central spring, the ends of the reverse or side springs being below the adjacent ends of the central spring, and movable or swinging connectors for the associated ends of the several springs, and a base piece for the central spring, substantially as shown and described.

2. A wagon spring consisting of a central spring and two side springs, one on either side of the central spring, and connectors for said springs, and a base piece to support the springs, in combination with movable blocks or bodies to shift the bearings of the connectors, substantially as set forth.

3. A wagon spring consisting of a central spring and two side springs, one on either side of the central spring, and connectors for said springs, and a base piece to support the springs, in combination with reversible blocks or bodies held by the central spring, to shift the bearing-points of said connectors, and detents or holders for said reversible blocks, substantially as set forth.

In witness whereof I have hereunto set my hand, this 24th day of August, 1895, in the presence of two subscribing witnesses.

WARREN R. MARKHAM.

Witnesses:
E. B. WHITMORE,
M. L. WINSTON.